United States Patent
Lagnié

(10) Patent No.: US 10,586,450 B2
(45) Date of Patent: Mar. 10, 2020

(54) PARKING DYNAMIC REGULATION METHOD, ASSOCIATED PAYMENT TERMINAL AND PARKING REGULATION SYSTEM

(71) Applicant: FLOWBIRD, Paris (FR)

(72) Inventor: David Lagnié, Oselle-Routelle (FR)

(73) Assignee: FLOWBIRD, Paris (FR)

( * ) Notice: Subject to any disclaimer, the term of this patent is extended or adjusted under 35 U.S.C. 154(b) by 0 days.

(21) Appl. No.: 16/191,523

(22) Filed: Nov. 15, 2018

(65) Prior Publication Data

US 2019/0147742 A1    May 16, 2019

(30) Foreign Application Priority Data

Nov. 16, 2017    (FR) ..................... 17 60779

(51) Int. Cl.
*G08G 1/14*       (2006.01)
*G06Q 20/16*      (2012.01)
*G07F 17/24*      (2006.01)

(52) U.S. Cl.
CPC .............. *G08G 1/142* (2013.01); *G06Q 20/16* (2013.01); *G07F 17/242* (2013.01); *G07F 17/246* (2013.01); *G08G 1/147* (2013.01); *G08G 1/148* (2013.01); *G06Q 2240/00* (2013.01)

(58) Field of Classification Search
CPC .... G06Q 20/16; G06Q 2240/00; G08G 1/147; G08G 1/148; G07B 15/06; G07B 15/00; G07F 17/242; G07F 17/24
See application file for complete search history.

(56) References Cited

U.S. PATENT DOCUMENTS

| 2006/0250278 A1* | 11/2006 | Tillotson | G08G 1/14 340/932.2 |
| 2007/0040701 A1* | 2/2007 | Browne | G08G 1/14 340/932.2 |
| 2012/0130872 A1* | 5/2012 | Baughman | G07B 15/02 705/32 |

(Continued)

FOREIGN PATENT DOCUMENTS

| FR | 2 968 814 A1 | 6/2012 |
| WO | 00/23949 A1 | 4/2000 |
| WO | 2012/076647 A1 | 6/2012 |

OTHER PUBLICATIONS

French Search Report, dated May 9, 2018, from corresponding FR application No. 17 60779.

*Primary Examiner* — Mirza F Alam

(74) *Attorney, Agent, or Firm* — Young & Thompson

(57) ABSTRACT

Disclosed is a dynamic parking regulation method, from a set of payment terminals arranged on the roadway for the sale and issuing of at least rights to park, wherein each is associated with a right to park in a parking space, wherein the method includes the following steps implemented by each payment terminal provided with a data capture device that is designed to capture data that is representative of the occupation of the parking space close by: capturing data that is representative of the occupation of the parking space close to the given terminal with the aid of the capture device; and obtaining an updated right to park based on the occupation of a parking place determined as a function of at least the captured data, and issuing at least one right to park as a function of updated right to park.

10 Claims, 2 Drawing Sheets

(56) References Cited

U.S. PATENT DOCUMENTS

| | | | |
|---|---|---|---|
| 2012/0299749 A1* | 11/2012 | Xiao | G08G 1/04 |
| | | | 340/932.2 |
| 2013/0290076 A1 | 10/2013 | Bobillier-Chaumont | |
| 2014/0335897 A1* | 11/2014 | Clem | G08G 1/0112 |
| | | | 455/456.3 |
| 2017/0045369 A1* | 2/2017 | Kim | G01C 21/3685 |

* cited by examiner

PARKING DYNAMIC REGULATION METHOD, ASSOCIATED PAYMENT TERMINAL AND PARKING REGULATION SYSTEM

TECHNICAL FIELD

The present invention relates to the field of payment terminals located in the public area with open access for the sale and delivery of at least parking tickets wherein each is associated with a right to park in a parking space.

BACKGROUND

FR 2 968 814 A1 discloses a parking ticket machine designed to provide a paid service for sending an SMS (Short Message System) message, an MMS (Multimedia Messaging Service) message or an e-mail, wherein the message may possibly be accompanied by an image, a video or sound content recorded by a device for capture the parking ticket machine or received by the parking ticket machine via a communication device a short distance away from the parking meter.

SUMMARY

One of the aims of the invention is to propose another solution based on a payment terminal for parking control purposes.

For this purpose, according to a first aspect, the invention proposes a dynamic parking regulation method based on a set of payment terminals disposed on the roadway and usable for the sale and issuing of at least parking tickets, wherein each is associated with a right to park in a parking space, and wherein the method is characterized in that it comprises the following steps implemented by each payment terminal, wherein each terminal is provided with a data capture device that is designed to capture data representing occupation of the parking place near the payment terminal:

capturing data representing occupation of the parking space(s) close to a given terminal with the aid of the capture device;

obtaining an updated right to park in a parking space based on parking place occupancy determined according to at least the captured data and issuing at least one parking ticket according to the updated right to park.

Such a method contributes to regulating the parking of the vehicles by updating the right to park according to the current occupation of the parking spaces (depending on the embodiments, the current occupation near a given terminal, or alternatively the proximity to the set of terminals).

The dynamic parking regulation method according to the invention may comprise one or more of the following optional features, taken individually or in any technically feasible combination:

the right to park includes one or more elements including an authorized parking period, an authorized parking area, a parking fee;

each payment terminal of the set belongs to a system comprising a computer platform connected to each payment terminal via a telecommunication network, while the method comprises the following steps:

transmission of the data captured by each payment terminal to the platform via the telecommunication network;

updating by the platform of the right to park in given parking places according to the occupation of the places determined from the collected data transmitted, wherein a discounted parking fee for a terminal is a function of the determined occupation of the places close to the terminal and the determined occupation of places close to the set of terminals;

transmission of the discounted parking fee determined for places near the given terminal by the platform, to each terminal for which a parking fee has been updated via the telecommunication network;

the dynamic parking control method comprises:

the preparation by the platform of messages for directing the drivers of vehicles to geographical areas with unoccupied parking spaces, according to the respective occupation of places near given terminals; and dissemination of the given messages via telecommunication links to message display equipment intended for the vehicle drivers.

According to a second aspect, the present invention proposes a payment terminal arranged on the roadway and used for the sale and issuance of at least parking tickets, wherein each ticket is associated with a right to park in a parking space, characterized in that the payment terminal is provided with a data capture device designed to capture data that is representative of the occupation of the parking places near the given payment terminal, wherein the payment terminal is designed to obtain an updated right to parking according to the parking place occupancy determined based on at least the captured data, and to issue at least one parking ticket according to the updated right to park.

According to a third aspect, the present invention proposes a parking control system comprising a plurality of payment terminals according to the second aspect of the invention, wherein a computer platform is connected to each payment terminal via a telecommunications network, wherein each terminal is designed to transmit the captured data to the platform via the telecommunication network, and wherein the platform is designed to determine the occupation of the respective parking places near the terminals as a function of at least the captured data, and to update the right to park in places according to the occupancy of the given places and to transmit to each terminal the discounted parking fee determined for places close to the terminal, wherein the terminal is designed to then issue a parking ticket according to the updated right to park.

The invention and its advantages will be better understood upon reading the description which follows, given solely by way of non-limiting example, and with reference to the appended drawings.

DETAILED DESCRIPTION

Figure 1:
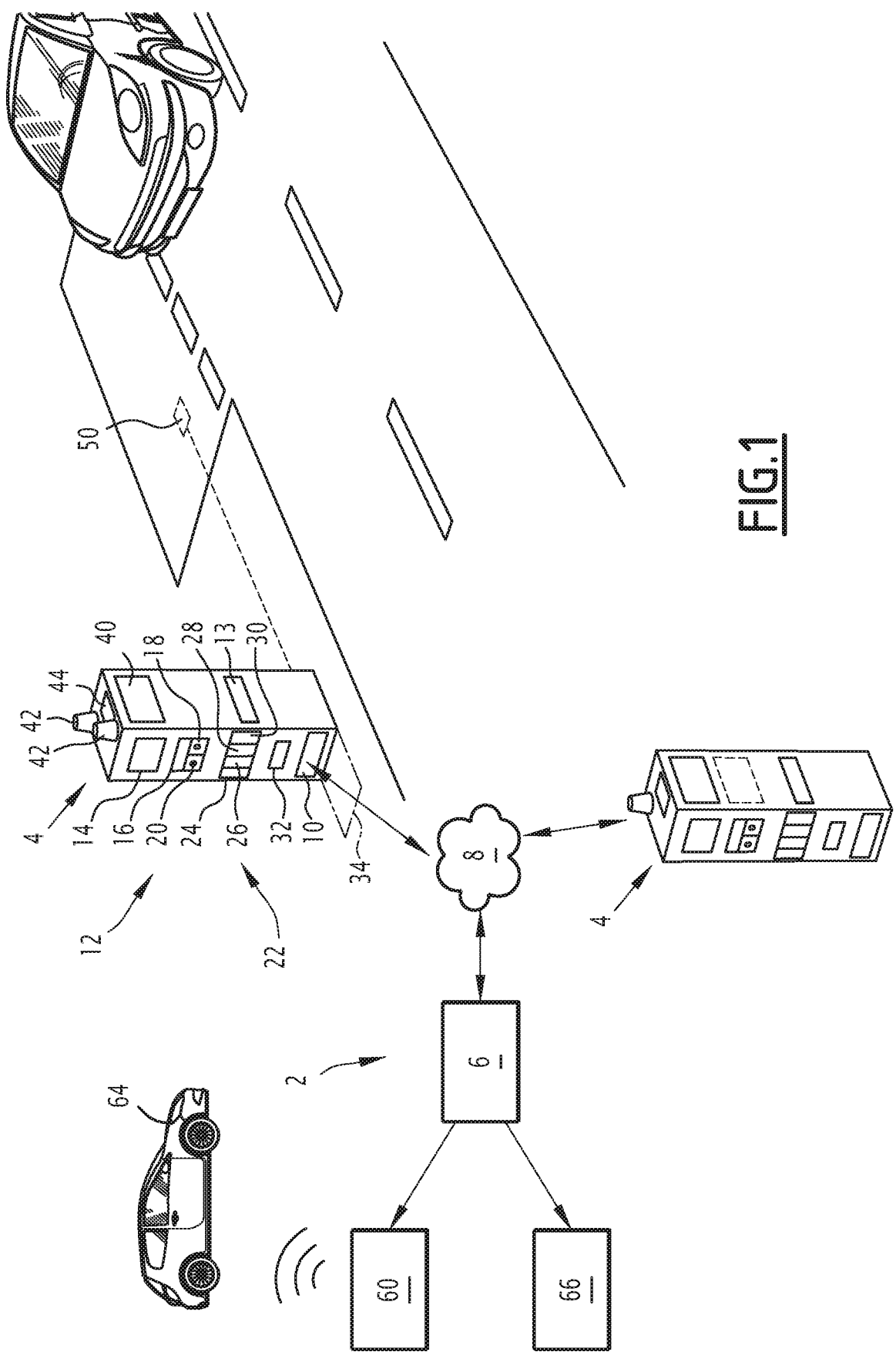
FIG. 1 shows a schematic overview of a parking control system comprising a plurality of payment terminals arranged on the street.

As shown in FIG. 1, the parking regulation system 2 comprises a plurality of payment terminals 4 and a computer platform 6. The computer platform 6 comprises, in particular, a computer server that is in communication with each of the payment terminals 4 through a telecommunication network 8.

The payment terminals 4 are open access, arranged on the roadway, and distributed, for example, within a city.

Each payment terminal 4 is a parking ticket machine designed to issue parking tickets to allow users to park their vehicle in parking spaces until a time limit authorized by the right to park.

In the present description, a "user" designates a person using a payment terminal 4 of the parking control system 2 issuing parking tickets.

"Roadway" includes the roadway reserved for vehicle traffic, parking spaces reserved for vehicle parking, and sidewalks and pedestrian spaces reserved for pedestrian traffic.

Each payment terminal 4 is in communication with the computer server 6 for the exchange of data via the telecommunication network 8.

Each payment terminal 4 comprises a communication interface 10 that is designed to implement communication of the payment terminal 4 with the computer server 6 via the telecommunications network 8.

The telecommunication network 8 is a wired or wireless telecommunications network. The telecommunication network 8 may be, for example, a wired telephone network, a mobile telephone network (GSM, UMTS, LTE, LTE Category 4, LTE Category 1, LTE Category M1, LTE category M1, NB1 . . . ), a computer network (LAN, WAN), the Internet, a local network (WIFI, Bluetooth, Lora, Lifi, Zigbee, Z-Wave, Dust, ANT+, NFC) . . . .

Each payment terminal 4 comprises a human-machine interface device 12 allowing the user to interact with the payment terminal 4, in particular to obtain a right to park.

The human-machine interface device 12 comprises, for example, a data display device 14, a pointing device 16 for the selection of fields and/or buttons in a graphical user interface, an alphanumeric keyboard 18 for inputting alphanumeric characters and/or one or more physical buttons 20. The display device 14 is, for example, a touch screen to allow pointing and/or entering data directly on the screen.

Each payment terminal 4 further comprises a storage block 13 that is designed to store the rights to park used by this terminal 4 for the parking spaces for which it issues parking tickets.

The right to park contains, depending on the case in question, one or more of the following:
  one or more free parking time slots possibly associated with maximum periods of free parking time within these ranges; and/or
  one or more paid parking slots associated with possibly maximum parking time-slots; and within these time-slots, paid parking periods each of which is associated with rates that may be fixed, degressive or progressive, as a function of the parking period.

The human-machine interface device 12 is designed to extract these elements of the rights to park from the storage block 13 and to display them to users on the data display device 14 for the purpose of selecting a parking period and issuing a parking ticket corresponding to the selection.

Each payment terminal 4 comprises a processing device 22 to defining and issue to a user a parking ticket via the payment terminal. The parking ticket 4 indicates, for example, a maximum parking time and a price. The processing block 22 is designed to determine such a maximum parking time and the associated price, as a function of the elements of the right to park memorized in the storage block 13, and, for example in the case in question, also a parking period as a function of the current time and the payment by the user via the man-machine interface device 12.

The processing device 22 is further designed to allow payment by the user for the parking ticket thus defined: it thus comprises, for example, an electronic payment terminal 24 designed for card payment, in particular using a smart card, in particular a private or bank card, a money selector 26 designed for payment with one or more coins, a bank note reader 28 designed for payment with one or more bank notes and/or a contactless payment terminal 30 designed for payment with an electronic device (smart card, smartphone . . . ) through contactless communication between the contactless payment terminal and the electronic device, for example by a near field communication (NFC).

Each payment terminal 4 may optionally comprise a printing device 32 for printing a receipt, for example a parking ticket.

Each payment terminal 4 has a usage zone 34 which is the zone in which a user must stand in order to be able to use the payment terminal 4, and, in particular, to be able to use the human-machine interface device 12 and the processing device of the payment terminal 4. The usage zone 34 is thus comprises an area of one to two square meters located in front of the payment terminal 4.

Each payment terminal 4 is provided with a parking data capture device 40 that is designed to capture parking data that is representative of the occupation of the parking spaces near the given payment terminal 4 (below, reference is made to these parking spaces as places "associated" with the given terminal 4).

The data capture device 40 comprises in one embodiment:
  a system 42 for capturing images of parking spaces located near the payment terminal 4 (for example, the image capture system 42 comprises cameras 42 in sufficient number and oriented in a fixed or dynamic manner, in order to obtain images of parking spaces around the given terminal 4); and/or
  a collection interface 44 designed to collect vehicle presence data provided by a set of sensors 50 designed to detect the presence or absence of a vehicle in a given parking space located near the terminal 4, and to transmit these presence data to the interface 44.

The parking data capture device 40 is designed to capture this data automatically (whether or not there is user interaction with the payment terminal 4).

Each payment terminal 4 is designed to regular send the parking data that is representative of the occupation of the parking spaces as captured by the data capture device 40 (corresponding, in this case, to the images of the system 42 for capturing images and/or presence data collected by the interface 44), to the computer server 6, via the communication interface 10 of the payment terminal 4.

The computer server 6 is designed to collect and process the data sent by the payment terminals 4 in sequence and, to analyze the occupation and/or the occupancy rate of the parking spaces in the vicinity of these terminals based on these data.

The computer server 6 is further designed to update one or more elements of the content of the right to park for at least the one payment terminal 4 in question, or for each payment terminal 4 of a subgroup of the payment terminals 4 in question, or for each payment terminal 4 of the dynamic parking control system, based on at least:
  criterion C1: i.e. the occupation and/or the occupancy rate of parking spaces located respectively around the given terminal 4; and/or criterion C2: i.e. the occupation, and/or the occupancy rate, of the parking spaces respectively located around some or all of the terminals 4 of the payment system 2; and/or criterion C3: i.e. of the occupation and/or the occupancy rate, of the parking spaces located respectively around the given payment terminal 4 relative to the occupation and/or the occupancy rate of the parking spaces located respectively around, some of the other or all of the other payment terminals 4.

In one embodiment, the update may include a change of the right to park content linked to the terminals associated with the least-occupied parking spaces (terminals A). They will, for example, be made more through this update when compared to the parking fee attached to terminals associated with a higher occupancy rate of parking spaces (terminals B) in order to promote the parking of vehicles where there are parking places available and thus free up saturated areas.

For example, for terminals A: increase free parking time slots or maximum periods of free parking time within these time slots; and/or increase the maximum parking periods during one or more paid parking time lots, increase the paid parking periods for a given tariff etc.; and/or for terminals B: reduction of the free parking time slots or the maximum periods of free parking time within these time slots; and/or decrease the maximum parking times during one or more paid parking time slots, decrease paid parking periods for a given rate etc.

The computer server 6 is, for example, designed to send the updated rights too park via the telecommunication network 8 to the payment terminals 4, wherein the latter are designed, upon their reception to send the updated rights to park received concerning the terminal in question to the storage block 13 via the interface 10 for storage in place of the previously memorized rights to park.

For example, the computer server 6 is designed to disseminate this information more widely.

The computer server 6 is, for example, designed to upload the rights to park associated with the identification, for example the address, of the payment terminals to one or more service providers 60 for the subsequent transmission, for example via the Internet, by these providers to individual telecommunication devices (e.g. mobile phones, computers . . . ) subscribers, including motorists, and then displaying this information (or information determined according to these rights to park) on a screen for the attention of subscribers. These service providers may, for example, provide these subscribers via their telecommunications devices, in addition to this updated information on current parking fees, regularly updated road traffic data, route calculations and, for example, guidance to available parking spaces (nearest or most closely matched to subscriber-defined criteria), based, in particular, on updated information on current rights to park.

In one embodiment, a service provider 60 may remotely issue, in the context of mobile applications such as, for example, the Whoosh® application, parking tickets to subscribers via their telecommunications devices, established as a function of this updated information on current rights to park.

For example, the computer server 6 may be designed to send the rights to park respectively associated with the identification, for example the address of the payment terminals, to one or more traffic data providers 66 and then display this information on display panels placed by the roadway for the motorists.

Motorists will know where to go to benefit from available rights to park and, optionally the most favorable.

In the context of this dissemination, a preliminary selection of the information is carried out in one embodiment so that:

only information concerning the rights to park associated with the terminals located at a given maximum distance from a display panel is displayed on the display panel; and/or only information concerning the rights to park associated with the terminals situated at a given maximum distance from the telecommunication device or from a place input by the user of the device, is displayed on the screen of the telecommunication device.

Figure 2:
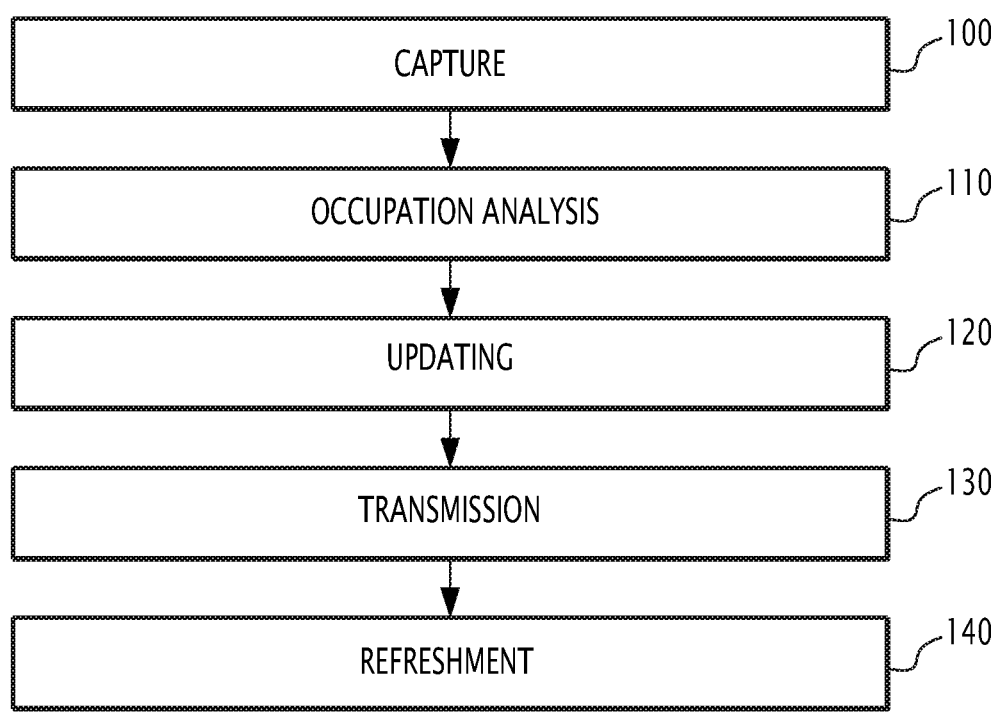
FIG. 2 shows a flowchart illustrating steps of a dynamic parking regulation method, implemented using the parking control system of FIG. 1.

The operation of the parking control system 2 will now be described with reference to FIG. 2 showing a flowchart of a computer-implemented dynamic parking control method. This method is regularly implemented, for example several times per hour in one embodiment, for example every x minutes, wherein x is between 1 second and 3 minutes.

In a data capture step 100, the parking data capture device of each payment terminal 4 of the control system 2 captures parking data, and the payment terminal 4 sends these data to the computer server 6.

In a collection step 110, the computer server 6 collects, and analyzes the occupation and/or the occupancy rate of parking spaces near these terminals.

In a refresh step 120, the computer server 6 updates the parking fee for one or more payment terminals 4 based on these collected and analyzed data.

In a transmission step 130, the computer server 6 transmits each updated parking fee relating to a given payment terminal 4 to the payment terminal. In some embodiments, the computer server 6 may also disseminate this information more widely: to service providers or display panel subscribers via road traffic data providers 60, 66.

In a refresh step 140, each payment terminal 4 having received an updated parking fee, stores it in the storage block 13 in place of the previously stored parking fee.

In parallel with this operation of a payment terminal 4 of the parking control system 2 as described in steps 100 to 140, at any time, a user may use the payment terminal 4 to obtain a parking ticket via the human-machine interface device 12. The processing block 22 determines a maximum parking time and, if necessary, the price, as a function of the elements of the rights to park currently stored by the storage block 13, and the duration of parking selected by the user. Thereafter, the processing block 22 issues the corresponding parking ticket, subject to the payment, if any, of the required price.

The use of payment terminals 4 located on the roadway and connected to a computer server 6 for the collection of parking data near the payment terminals 4 makes it possible to collect these data over the entire area covered by the payment terminals 4 and to then encourage motorists to park in areas with available parking capacity at that time, by modifying the rights to park associated with the various payment terminals.

The updating of its parking fee by a terminal is performed independently of any interaction of the terminal with a user for issuance of a right to park.

In one embodiment, the updating of the right to park for a payment terminal 4 is made only "local" by the given terminal 4 based on the occupancy rate of the available parking spaces near the given terminal.

In the embodiment described above, the right to park was defined according to the parking fee associated with the given terminal, a current time corresponding to the start of parking, and a required parking period from the current time. Other conditions of definition of rights to park are possible. In other embodiments, the right to park is defined according to the parking fee associated with the given terminal, from a current time to the end of parking, and a parking starting time indicated by a right to park issued previously.

The invention claimed is:

1. A dynamic parking regulation method, from a set of payment terminals arranged on a roadway and used for sale and issuing of at least parking tickets,
   wherein each parking ticket is associated with a right to park in a parking place,
   wherein each payment terminal is provided with a data capture device that is designed to collect data that is representative of occupation of parking place(s) near a given payment terminal,
   wherein the method comprises the following steps implemented by each payment terminal:
      capturing data that is representative of the occupation of the parking place(s) close to the given payment terminal with the aid of the capture device; and
      updating the right to park as a function of the occupation of the parking place(s) determined as a function of at least the captured data and issuing at least one parking ticket as a function of the updated right to park;
   wherein the updating step is carried out by transmission of the updated right to park via a telecommunications network from a computer platform connected to each payment terminal, and to which each payment terminal has previously transmitted the data representative of the occupation of parking places via the network, and
   wherein the right to park comprises one or more elements among an authorized parking period, an authorized parking time slot, and a parking price.

2. The dynamic parking control method according to claim 1, wherein the right to park comprises at least two of the authorized parking period, the authorized parking time slot, and the parking price.

3. The dynamic parking control method according to claim 1, wherein each payment terminal of the set belongs to a system comprising the computer platform connected to each payment terminal via the telecommunications network, wherein the method comprises the following further steps:
   transmission by each payment terminal of the captured data to the platform via the telecommunications network;
   updating by the given platform of the right to park in the parking places as a function of the occupation of the places determined from the collected data transmitted, wherein the updated right to park for a given payment terminal comprises the determined occupation of the places close to the given payment terminal, and the determined occupation of places near all the payment terminals; and
   transmission by the platform, via the telecommunications network, to each payment terminal for which a right to park has been updated, of the given updated right to park determined for places near the given payment terminal.

4. The dynamic parking control method according to claim 1, further comprising:
   preparation by the platform, according to respective occupation of places near the given determined payment terminals, of messages for directing drivers of vehicles to geographical areas with unoccupied parking spaces; and
   disseminating the messages via telecommunication links to display equipment of the messages intended for the vehicle drivers.

5. A parking control system comprising:
   a plurality of payment terminals arranged on the roadway and used for the sale and issuing of at least parking tickets wherein each is associated with a right to park in a parking place, wherein each payment terminal is provided with a data capture device that is designed to capture data that is representative of the occupation of the parking place(s) near the payment terminal, and
   each payment terminal is designed to obtain an updated right to park as a function of occupation of determined parking places as a function of at least the captured data and to issue at least one parking ticket according to the updated right to park, and
   a computer platform connected to each payment terminal via a telecommunications network, wherein each payment terminal is designed to transmit the captured data to the platform via the telecommunications network, wherein the platform is designed to determine the respective occupation of the places in the vicinity of the given payment terminals as a function of at least the captured data, to update the rights to park of the places as a function of the occupation of the determined places, and to transmit to each payment terminal the updated rights to park determined for the places close to the given payment terminal, wherein the payment terminal is designed to then issue a parking ticket as a function of the updated right to park, wherein the right to park comprises one or more elements among an authorized parking period, an authorized parking time slot, and a parking price.

6. The parking control system according to claim 5, wherein the right to park comprises at least two of the authorized parking period, the authorized parking time slot, and the parking price.

7. The parking control system according to claim 5, wherein the platform is designed to prepare messages as a function of the respective occupation of places in the vicinity of the determined payment terminals, for directing the drivers of vehicles to geographic areas having unoccupied parking spaces and for disseminating the messages via telecommunication links to display equipment for the messages to the vehicle drivers.

8. The dynamic parking control method according to claim 2, wherein each payment terminal of the set belongs to a system comprising the computer platform connected to each payment terminal via the telecommunications network, wherein the method comprises the following further steps:
   transmission by each payment terminal of the captured data to the platform via the telecommunications network;
   updating by the given platform of the right to park in the parking places as a function of the occupation of the places determined from the collected data transmitted, wherein the updated right to park for a given payment terminal comprises the determined occupation of the places close to the given payment terminal, and the determined occupation of places near all the payment terminals; and
   transmission by the platform, via the telecommunications network, to each payment terminal for which a right to park has been updated, of the given updated right to park determined for places near the given payment terminal.

9. The dynamic parking control method according to claim 2, further comprising:
preparation by the platform, according to respective occupation of places near the given determined payment terminals, of messages for directing drivers of vehicles to geographical areas with unoccupied parking spaces; and
disseminating the messages via telecommunication links to display equipment of the messages intended for the vehicle drivers.

10. The parking control system according to claim 6, wherein the platform is designed to prepare messages as a function of the respective occupation of places in the vicinity of the determined payment terminals, for directing the drivers of vehicles to geographic areas having unoccupied parking spaces and for disseminating the messages via telecommunication links to display equipment for the messages to the vehicle drivers.

* * * * *